Jan. 8, 1935.  C. MORROW  1,987,123
HEATER OR COOLER
Filed Jan. 20, 1933  4 Sheets-Sheet 2

INVENTOR
Clifford Morrow
BY Geo. B. Pitts
ATTORNEY

Jan. 8, 1935. C. MORROW 1,987,123
HEATER OR COOLER
Filed Jan. 20, 1933 4 Sheets-Sheet 3
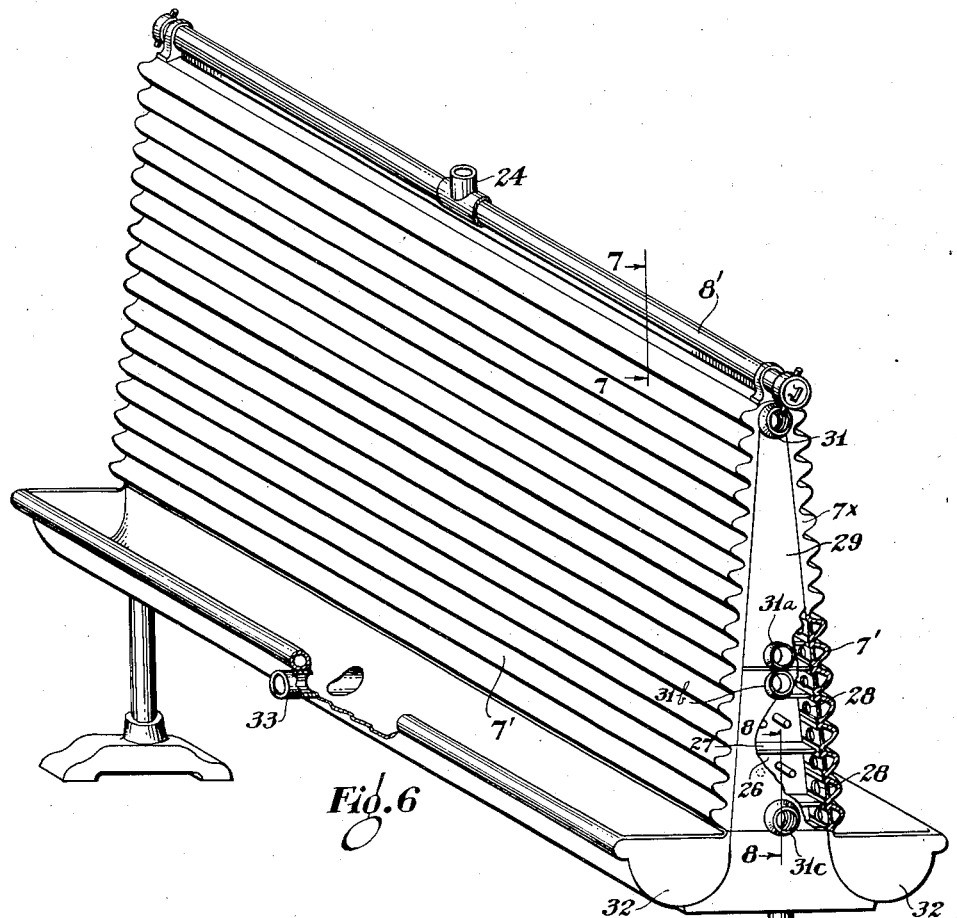
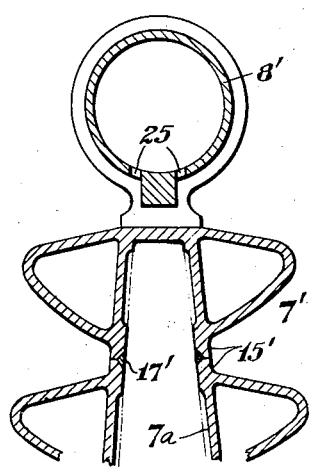
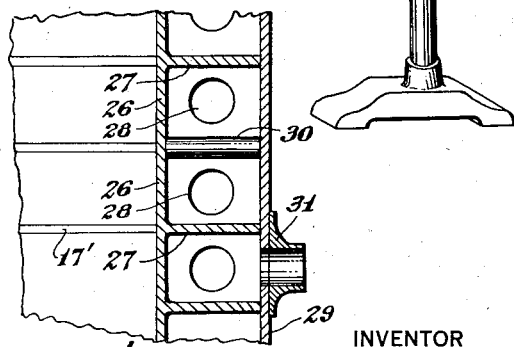
INVENTOR
Clifford Morrow
BY Geo. A. Pitts
ATTORNEY Jan. 8, 1935.　　　　C. MORROW　　　　1,987,123
HEATER OR COOLER
Filed Jan. 20, 1933　　　4 Sheets—Sheet 4
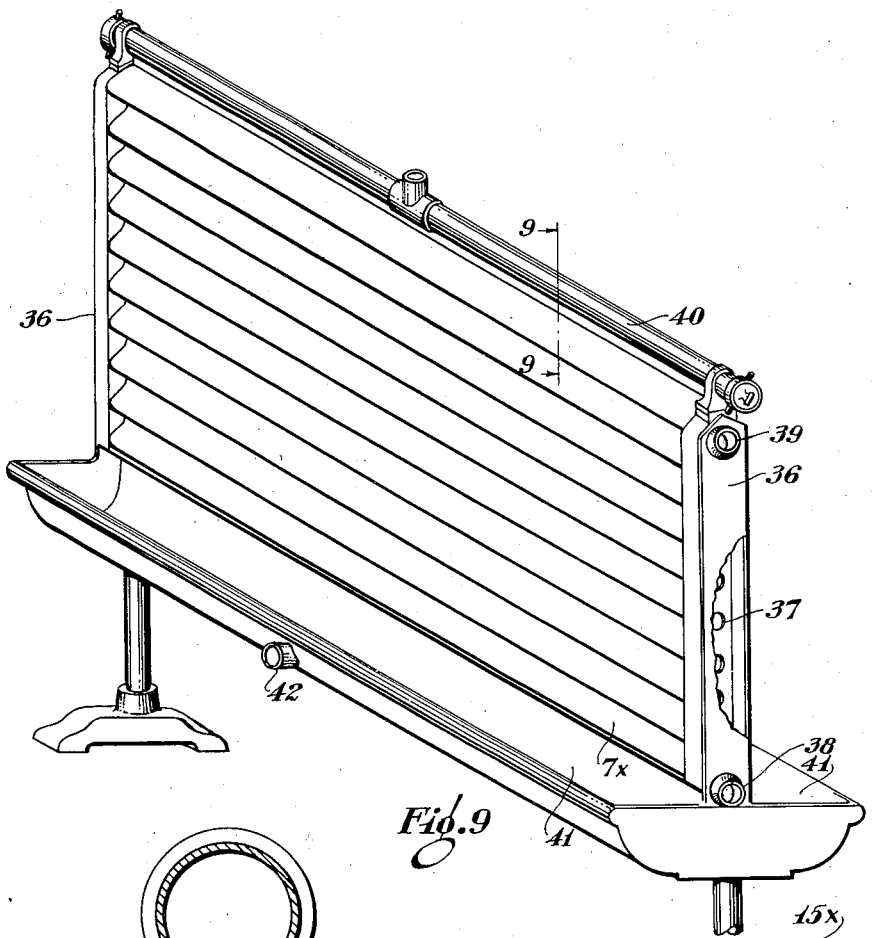
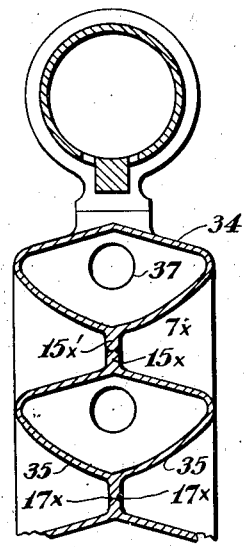
Fig.10
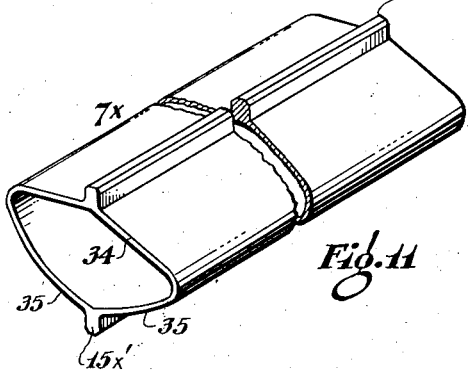
Fig.11
INVENTOR
Clifford Morrow
BY Geo. B. Titts
ATTORNEY Patented Jan. 8, 1935

1,987,123

UNITED STATES PATENT OFFICE 1,987,123

HEATER OR COOLER

Clifford Morrow, Canton, Ohio, assignor to The H. H. Miller Industries Company, Canton, Ohio, a corporation of Ohio Application January 20, 1933, Serial No. 652,637

11 Claims. (Cl. 257—179)

This invention relates to an apparatus for heating or cooling liquids, for example milk and cream, more particularly an apparatus of the surface tubular type wherein the liquid flows over the walls of a plurality of tubes or portions of tubes disposed one above the other and through which a heat transfer medium flows, so that heat units will be transferred or conducted through such walls to treat the liquid.

One object of the invention is to provide an improved construction of tube or tubing in which a relatively large area of the walls thereof is exposed for contact with the milk, thereby insuring maximum flow surfaces for the liquid and high efficiency in the transfer of heat units.

Another object of the invention is to provide an improved apparatus of this character that is relatively simple in construction, has large capacity and may be economically constructed.

Another object of the invention is to provide an apparatus of this character formed of improved tubing having a shape permitting them to be connected together into a unitary structure to provide a continuous flow surface.

A further object of the invention is to provide an improved tubing capable of being formed in a ready manner with walls of a predetermined thickness.

A still further object of the invention is to provide improved tubing the walls of which are arranged so that sections or portions thereof may be connected to the walls of other sections or portions to form a unitary structure.

Other objects of the invention will be apparent to those skilled in the art to which my invention relates from the following description taken in connection with the accompanying drawings, wherein Fig. 1 is a view partly in elevation and partly in section on the line 1—1 of Fig. 2, embodying my invention.

Fig. 4 is a fragmentary section, enlarged.

Fig. 6 is a perspective view showing a different embodiment of the invention.

Figs. 7 and 8 are sections on the lines 7—7 and 8—8, respectively, of Fig. 6.

Fig. 9 is a perspective view of another embodiment of the invention.

Fig. 10 is a section on the line 10—10 of Fig. 9.

Fig. 11 is a perspective view of a tube section of the form shown in Figs. 9 and 10.

Figure 1:
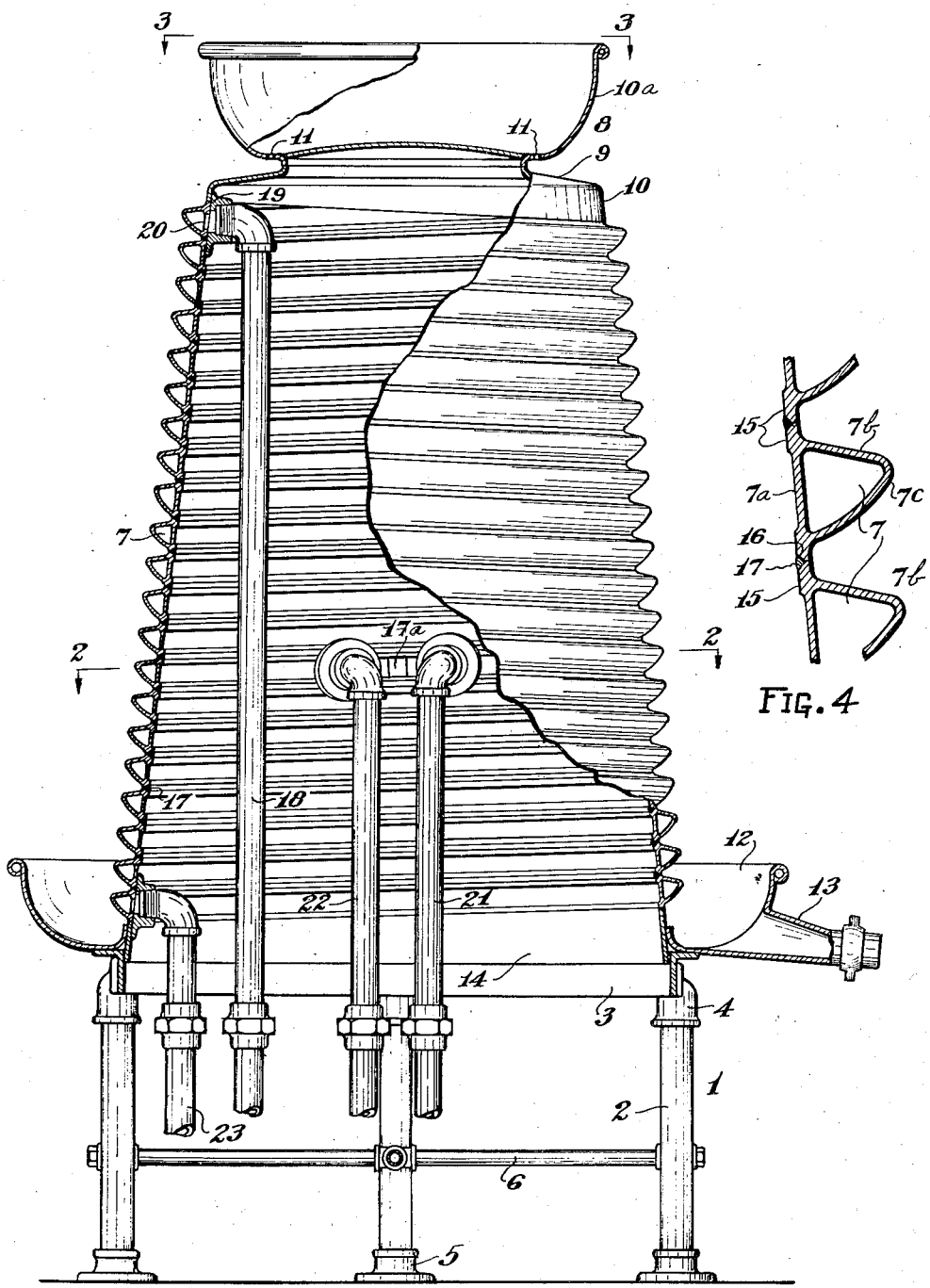
Figure 2:
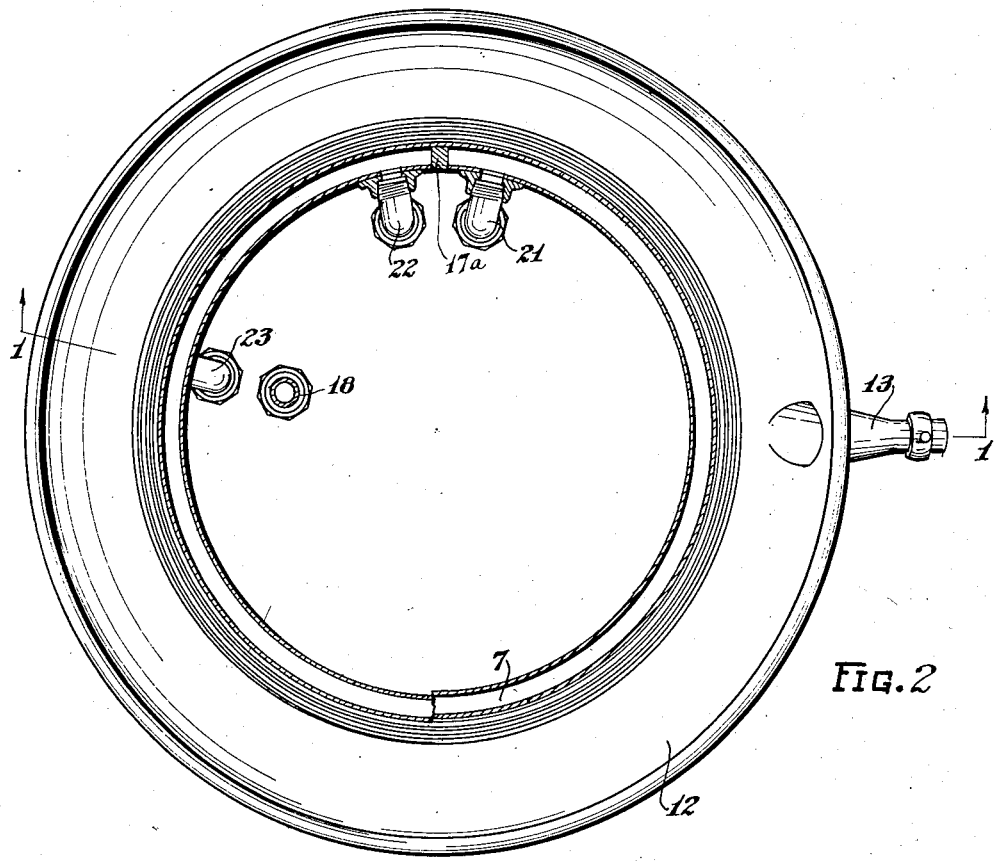
Fig. 2 is a section on the line 2—2 of Fig. 1.
Figures 3, 5:
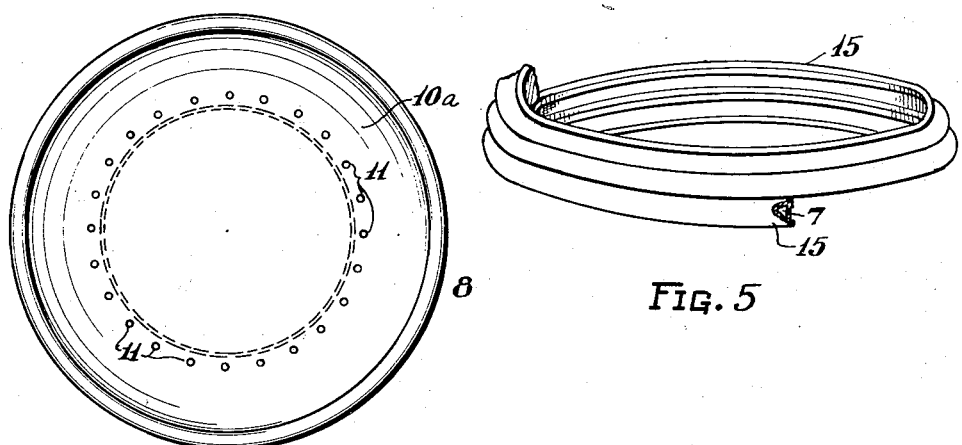
Fig. 3 is a plan view on the line 3—3 of Fig. 1.
Fig. 5 is a perspective view of a portion of apparatus showing the arrangement of the tube.

My invention comprehends an improved shape of tube or tubing for the circulation of a heat transfer medium and providing a maximum surface over which liquid may flow. The tubing is of a shape permitting it to be formed by the extrusion process, whereby certain advantages are attained; for example, the walls of the tubing are seamless; the tubing may be of varying shapes in cross section, the walls of the tubing may be made of any desired thickness, all of the same or of different thicknesses, and flanges may be provided whereby sections of the tubing may be connected together to form a unitary structure; also, the tubing may be readily bent to form an annular shaped surface cooler, as shown in Figs. 1 to 5, inclusive.

In the preferred forms of construction, the tubing is of substantially triangular shape, so that the maximum area of the tubing walls may be utilized as flow surfaces to insure high efficiency. For example, in Figs. 9 and 10 substantially the entire area of the tubing walls are utilized, whereas in Figs. 1 to 8, inclusive, approximately three-fourths of the wall area is exposed and utilized.

Referring to Figs. 1 to 5, inclusive, of the drawings, 1 indicates a base or support, preferably of skeleton construction and comprising a plurality of legs 2 suitably connected to a frame 3, which, in the arrangement of the circulating tubes for the heat transfer medium herein shown, is of annular shape. The frame 3 may be formed from angle bars and provided with inverted caps 4 fitting over the legs 2. The legs 2 are provided with flanges 5, which are screw threaded on the legs 5 and permit of adjustment to accommodate the legs to any unevenness in the floor. The legs may be braced by tie-rods 6.

7 indicates the tubing through which the heat transfer medium circulates or flows. In this embodiment of the invention, the tubing 7 is bent into spiral form with its convolutions in contact and connected together throughout their length to form a unitary member of substantially conical shape. The tubing 7 may be formed from a single section thereof or a plurality of sections connected end to end, depending upon the size or capacity of the apparatus.

8 indicates as an entirety a receiver and distributor preferably comprising a skirt 9 having a depending circumferential wall 10 and a receptacle 10a. The wall 10 is connected to the upper convolution of the tubing 7 to form a contiguous surface therewith to guide or distribute the milk to the exterior walls of the tubing. The receptacle 10a is formed in its bottom with a plurality of openings 11 which permit the milk to flow onto the skirt 10. The milk is delivered or discharged into the receptacle 10a in any suitable manner.

12 indicates a collector or trough disposed at and surrounding the lower end of the flow wall and arranged to receive the milk therefrom. The collector 12 is provided at one side with a discharge conduit 13, which may be connected to a pipe for conveying the milk to any desired apparatus or storing vat (not shown). The collector is preferably connected to the frame 3 in any suitable manner. The collector may also be connected to a ring 14 which is connected to the lower convolution of the tubing 7 and which forms the connecting member between said convolution and the frame 3.

The tubing 7 is extruded; such operation provides a section of the desired length and preferably formed of a metal having a relatively high co-efficient of heat conductivity, such as aluminum or aluminum alloy. The tubing 7 is of substantially triangular shape in cross section and consists of an inner side wall 7a and converging upper and lower walls 7b, 7c, respectively.

The wall 7a is provided along its upper and lower edges with flanges 15, preferably in the plane thereof, and these flanges abut the flanges of the adjacent upper and lower convolutions of the tubing. The abutting edges of the flanges are welded together in a well known manner. For this purpose, the inner edges of the flanges 15 are cut away to form a groove 16 for the welding material, as shown at 17. In this arrangement, the rear walls are alined and form the back for the unitary member. I also, by preference, weld the exterior edges of the flanges 15 to close the joint between them and to insure a smooth, contiguous exposed surface between adjacent tube convolutions.

It will be noted that the walls 7a, 7b, 7c, are so related, when the tubing 7 is bent into spiral form and its convolutions connected, that the upper wall 7b inclines downwardly and that the outer portions of the walls 7b and 7c are connected by a curved portion which prevents the milk from flowing off in a radial direction; also that the wall 7c curves downwardly and inwardly to a point near the inner portion of the adjacent upper wall 7b and tends therefore to guide the milk inwardly so that it will flow over substantially the entire surface of the latter wall. It will also be noted that by reason of the tube shape herein shown and the relative arrangement of the convolutions of the tubing 7, a relatively large area of the tube wall throughout its entire length, as compared to its total wall area, is exposed for contact by the milk in gravitating downwardly, so that a large volume of milk may be treated per unit of time. It will be understood that since the tubing is formed of extruded metal, the extent, shape and thickness of its walls may be readily changed to meet various conditions in actual practice.

The heat transfer medium may be supplied to either end of the conduit 7 and caused to circulate therethrough from end to end and discharged at the opposite end thereof; but by preference, I close the conduit at an intermediate point by a suitable plug, as shown at 17, so that a heat transfer medium at any predetermined temperature may be supplied to and circulated through the upper convolutions of the conduit and a heat transfer medium at a different, predetermined temperature may be supplied to and circulated through the lower convolutions of the conduit. In this last referred to arrangement, a discharge pipe 18 leads from the uppermost convolution, being connected thereto by a nipple 19 which registers with an opening 20 formed in the conduit wall 7a and a supply pipe 21 is connected to the convolution containing the plug 17a on the adjacent side thereof, and a discharge pipe 22 is connected to the convolution containing the plug 17a but at the opposite side thereof and a supply pipe 23 is connected to the lowermost convolution, each of these connections being similar to each connection for the pipe 18 as above described.

When the apparatus is used as a heater, hot water of any desired temperature is supplied by the pipe 21 to preheat the milk and hot water preferably having a temperature of approximately 143 degrees F., is supplied by the pipe 23. When the apparatus is used as a cooler, water having a temperature of approximately 60 degrees F. is supplied by the pipe 21 and brine having a temperature of approximately 20 degrees F. is supplied by the pipe 23. The heat transfer medium or mediums may of course have any desired temperature. In operation, the milk is supplied continuously to the receptacle 10a front which it flows by gravity through the openings 11 onto the skirt 9 and wall 10 and then over the walls 7b, 7c, of the conduit into the collector 12; whereas in the preferred arrangement above set forth, the heat transfer medium or mediums circulate from the lower convolutions to the upper convolutions.

It will be noted that in this form of construction the tubing is bent into spiral shape and the resulting convolutions connected so that it becomes a unitary structure. Such bending may be done upon a suitable form, the rear walls 7a being cut away at 7a' to facilitate such bending on the form throughout the entire length of tubing. This form of construction eliminates the necessity for any interior framing, which would increase the cost of the apparatus and labor in assembly.

While I have shown a construction in which the tubing is bent to form a heater or cooler of conical shape, the tubing may be bent convolutely about a form having the shape of a pyramid so that the resulting structure will be of this shape.

In Figs. 6, 7 and 8, I show a heater or cooler formed of straight sections of tubing, indicated at 7', which tubing is preferably similar in construction to the tubing used in the form shown in Figs. 1 to 5, except that the rear wall may be flat (see dotted lines in Fig. 7) instead of cut away. The flanges 15' of each tube section are connected to the flanges of adjacent upper and lower tube sections in a manner similar to that already described to form a unitary, continuous exterior flow wall. Each end of each tube section is preferably closed by a plate 7x soldered or welded to the walls thereof. In this arrangement I provide two flow walls so that the milk may flow thereover simultaneously from a single distributing member 8'. The member 8' comprises a pipe having an inlet 24 and discharge ports 25. The distributing member 8' is preferably similar in construction to the distributor shown in Letters Patent No. 1,352,215, dated September 7, 1920, and granted to Leroy S. Pfouts. The unitary flow walls are preferably inclined downwardly and outwardly, being supported in this position by a pair of walls 26 each arranged adjacent to but inwardly of the side edges of the flow walls. Each wall 26 is provided with horizontal division plates 27 disposed substantially in the plane of alternate joints between the pipe sections to form spaces into which the heat transfer medium flows from one pipe section and from which the medium flows into the next upper section to form a circulation system, openings 28 being formed in the walls 7a for this purpose. The circulation spaces are closed by an outer wall 29 which fits within and may be welded to the walls 7a, against the outer side edges of the plates 27 and outwardly extending pins 30, preferably formed integral with the adjacent wall 26. One of the walls 29 is provided with four hollow bosses 31, 31a, 31b, 31c, which register with openings formed in the wall 29 for communication with the adjacent circulation spaces.

One pipe for supplying the heat transfer medium is connected to the boss 31c. The medium flows through the lowermost tube sections and then succeeding tube sections upwardly and is discharged through the boss 31b to a discharge pipe (not shown) connected thereto, a plate 32 being provided in the space adjacent the bosses 31a, 31b, to effect flow of the medium through the boss 31b. The other supply pipe is connected to the boss 31a. The medium supplied thereto flows into the adjacent tube sections and through them and the succeeding tube sections upwardly and is discharged through the boss 31 to a discharge pipe (not shown).

32 indicates receivers disposed at the lower ends of the flow walls and arranged to receive the treated milk therefrom. Each receiver 32 is provided with a discharge pipe 33.

In Figs. 9, 10 and 11 I have shown a modified form of construction having a single series of tube sections 7x, disposed in a vertical plane. In this form of construction, each tube section 7x is of approximately triangular shape having an upper wall 34 and side walls 35 which curve downwardly and inwardly, and the upper flange 15x extends along a line intermediate the edges of the upper wall 34 and the lower flange 15x' depends from the lower ends of the side walls 35, the flanges being welded to the flanges of adjacent tube sections. For this purpose the opposite free edges of the flanges are cut away to form a recess for the welding material 17x.

The opposite ends of the tube sections are connected to the inner side walls of headers 36, said walls being formed with openings 37 aligned the tube-sections so that the heat transfer medium, which is supplied through an inlet nipple 38 and discharged through the nipple 39, may flow through all of the sections. When desired, division plates may be mounted in the headers, so that the medium will flow through the tube sections consecutively.

Those portions of the walls 34 opposite the flanges 15x are inclined slightly downwardly and outward to insure an even and rapid flow of the milk and each of these walls 34 is connected with the remaining walls 35 of the tube section by curved portions, instead of sharp corners, so that the tendency of the milk will be to adhere to the walls; also, the walls 35 curve downwardly and inwardly so that a large portion of the milk will be conveyed to the innermost portion of the adjacent wall 34, thereby insuring contact of the milk with the maximum area of the tube walls.

40 indicates a distributor, which may be similar to that disclosed in the aforesaid Letters Patent.

41 indicates receivers having discharge pipes, one thereof being indicated at 42.

By using an extruded tubing, I am enabled to form a conduit of the desired shape in cross section to provide for ready and economical assembly and at the same time surfaces arranged to permit flow of the milk thereover without danger of the milk flowing off these surfaces or dripping from one tube or convolution to a lower tube or convolution. By using tubing of triangular shape, I am enabled to use the major portion of the wall area thereof as the flow wall for the milk. As the milk flows over these exposed walls in a film, it is therefore rapidly treated since a relative large volume of heat transfer medium is circulating relative to these walls. I am also enabled to eliminate a large amount of labor in shaping, fitting and soldering, heretofore required in surface tubular heaters or coolers of the type herein shown and at the same time provide heat transfer walls of a predetermined, uniform thickness. The tubing is constructed of aluminum or aluminum alloy; therefore the tubing has long life since it does not have to be tinned and permits of ready cleaning at all times.

In the forms of construction herein shown in Figs. 1 to 8, inclusive, the inner walls 7a of the tubing form an unobstructed inner surface, which permits such walls to be covered with non-heat conducting material, such as cork, hair and other well known insulating materials, to prevent the radiation of heat.

When desired, the receptacle 10 and each of the collectors or receivers may be provided with covers and/or the entire apparatus may be enclosed in a casing.

To those skilled in the art to which my invention relates, many changes in construction and widely differing embodiments and applications of the invention will suggest themselves without departing from the spirit and scope thereof. My disclosures herein are purely illustrative and are not intended to be in any sense limiting.

What I claim is:

1. A surface heater or cooler comprising a series of tubing for a heat transfer medium each having a rear wall and upper and lower converging walls, each said rear wall having laterally extending flanges along its upper and lower edges secured in edge to edge relation to the flanges of adjacent upper and lower tubing to form a unitary structure, means for distributing liquid to the upper portion of said structure, a collector at the lower end of said structure, and means for supplying a heat transfer medium to said tubing for circulation therethrough.

2. A surface heater or cooler comprising tubing bent into spiral form, said tubing having a rear wall and upper and lower converging walls connected along their outer portions, and said rear wall provided along its upper and lower edges with flanges welded in edge to edge relation to the flanges of upper and lower convolutions of the tubing, means for distributing liquid on the upper convolution of the tubing, and means for supplying a heat transfer medium to said tubing.

3. A heater or cooler comprising tubing formed of metal having a relative high co-efficient of heat conductivity and comprising a rear wall and upper and lower walls disposed in converging relation and connected along their outer portions, said rear wall being provided throughout its upper and lower edges with continuous flanges extending laterally substantially in the plane of said wall and adapted to be welded to the flanges of adjacent tubing.

4. A heater or cooler comprising tubing formed of metal having a relative high co-efficient of heat conductivity and comprising a rear wall and upper and lower walls disposed in converging relation and connected along their outer portions, said rear wall being provided throughout its upper and lower edges with continuous flanges extending laterally substantially in the plane of said wall and adapted to be welded to the flanges of adjacent tubing, and said upper wall being inclined outwardly and downwardly relative to said rear wall.

5. A heater or cooler comprising tubing formed of metal having a relative high co-efficient of heat conductivity and bent into substantially spiral shape to form a conduit for a heat transfer medium, said tubing having a rear wall and upper and lower walls disposed in converging relation and connected along their outer portions and said rear wall being provided along its upper and lower longitudinal edges with continuous flanges extending laterally substantially in the plane of said wall, said flanges of adjacent convolutions being welded together in edge to edge relation and forming with said upper and lower walls contiguous flow surfaces.

6. A surface heater or cooler comprising a series of connected tubes each of approximately triangular shape and having upwardly and downwardly projecting flanges extending longitudinally from end to end thereof and adapted to be secured in edge to edge relation to the adjacent flanges of upper and lower tubes to form a continuous flow wall, means for supplying liquid to the uppermost tube of the series, a receiver below the lowermost tube and means for supplying a heat transfer medium to said series of tubes.

7. A surface heater or cooler comprising a series of connected tubes each of approximately triangular shape and having an upper wall and side walls connected along their lower ends, a flange depending from the lower ends of said side walls, a flange disposed centrally of the upper wall and projecting upwardly therefrom, said flanges being arranged to be secured in edge to edge relation to the adjacent flanges of upper and lower tubes, means for supplying liquid to the uppermost tube of the series, a receiver below the lowermost tube, and means for supplying a heat transfer medium to said series of tubes.

8. A surface heater or cooler comprising a series of connected tubes each of approximately triangular shape and having an inner wall, and upper wall and a side wall connected to the outer edge of said upper wall and the lower edge of said inner wall, flanges projecting upwardly and downwardly from said inner wall in the plane thereof and adapted to be secured in edge to edge relation to the adjacent flanges of upper and lower tubes to form with said upper and side walls a continuous flow wall, means for supplying liquid to the upper-most tube of the series, a receiver below the lowermost tube, and means for supplying a heat transfer medium to said series of tubes.

9. A surface heater or cooler comprising tubing bent into spiral form, the rear wall of said tubing having continuous, laterally extending flanges along its opposite longitudinal edges, said flanges throughout the respective convolutions of the form being secured in edge to edge relation with the flanges of adjacent convolutions, whereby the convolutions are secured together into a unitary structure, means for distributing liquid on the upper convolution of the tubing, and means for supplying a heat transfer medium to said tubing.

10. A surface heater or cooler comprising spiral tubing having its convolutions connected together throughout their length, said tubing having a rear wall and outwardly extending upper and lower walls, said rear wall having throughout its length and substantially in the plane thereof oppositely extending flanges secured together in edge to edge relation, whereby said upper and lower walls and said flanges form a continuous flow surface for liquid, means for distributing liquid on the upper convolution of the tubing, and means for supplying a heat transfer medium to the tubing for circulation therethrough.

11. A surface heater or cooler comprising a series of connected tubes each having an upper wall and converging side walls connected along their lower ends, a flange depending from the lower ends of said side walls, a flange projecting upwardly relative to said upper wall, said flanges being arranged to be secured in edge to edge relation to the adjacent flanges of upper and lower tubes, means for supplying liquid to the uppermost tube of the series, a receiver below the lowermost tube, and means for supplying a heat transfer medium to said series of tubes.

CLIFFORD MORROW.